United States Patent [19]

Bianco

[11] Patent Number: 4,600,361
[45] Date of Patent: Jul. 15, 1986

[54] SELECTIVELY CONTROLLED DUAL DELIVERY PUMP, PARTICULARLY FOR MOTOR VEHICLE APPLICATION

[75] Inventor: Carlo Bianco, Lugano, Switzerland
[73] Assignee: Strada Cantonale, Stabio, Switzerland
[21] Appl. No.: 614,831
[22] Filed: May 29, 1984
[30] Foreign Application Priority Data
Jun. 8, 1983 [IT] Italy ............................... 67628 A/83
[51] Int. Cl.[4] ............................................. F04D 29/50
[52] U.S. Cl. ................................. 415/146; 415/152 A; 415/38
[58] Field of Search .................. 415/26, 27, 146, 206, 415/152 R, 148, 152 A, 150, 209.38; 137/118

[56] References Cited
U.S. PATENT DOCUMENTS
2,932,444 4/1960 Walker ............................ 415/146 X
3,773,432 11/1973 Chow et al. ..................... 415/206 X
3,807,426 4/1974 Henes .............................. 137/118 X
4,091,644 5/1978 Bochan .......................... 415/146 X FOREIGN PATENT DOCUMENTS
1142593 9/1957 France ............................... 415/146

Primary Examiner—Robert E. Garrett
Assistant Examiner—Joseph M. Pitko
Attorney, Agent, or Firm—Wolf, Greenfield & Sacks

[57] ABSTRACT

A pump is disclosed wherein, in order to provide switching ability between two different delivery outlets, a stator casing bounds two superimposed manifold chambers, each chamber being in communication with the pump impeller housing through a respective tangential conduit. The chambers are sealed from each other by an elastic membrane operative to selectively cut off valve seats in each manifold chamber for rotation of the pump impeller in either directions.

8 Claims, 3 Drawing Figures

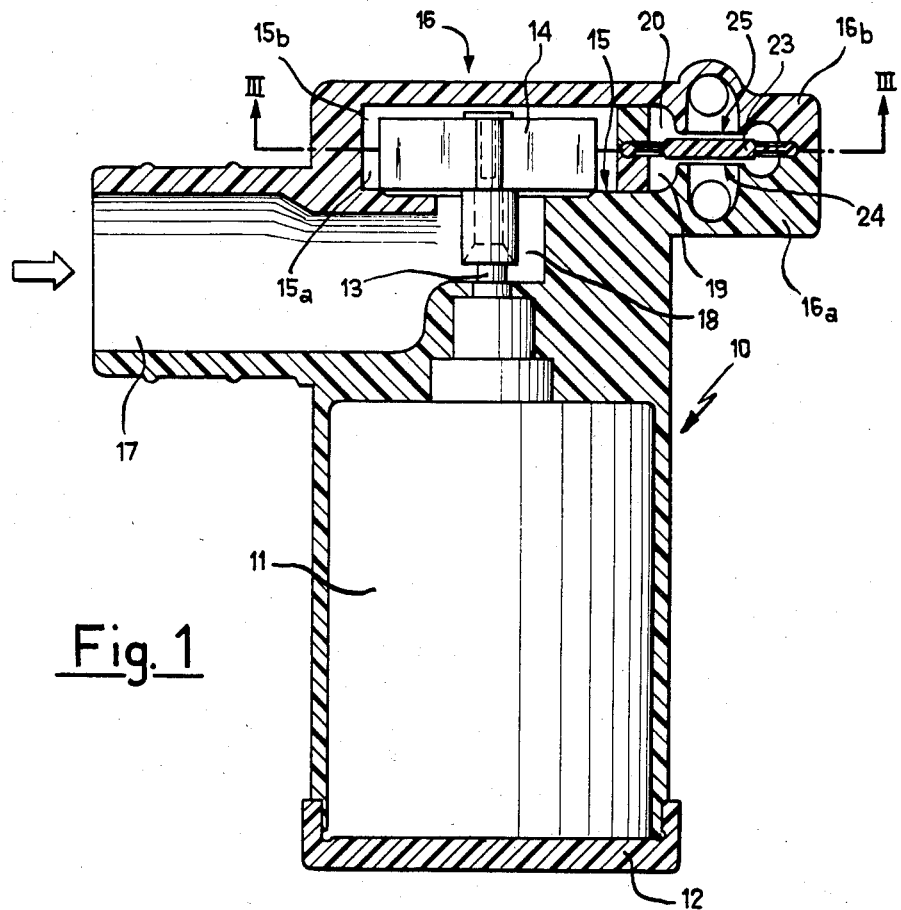
Fig. 1
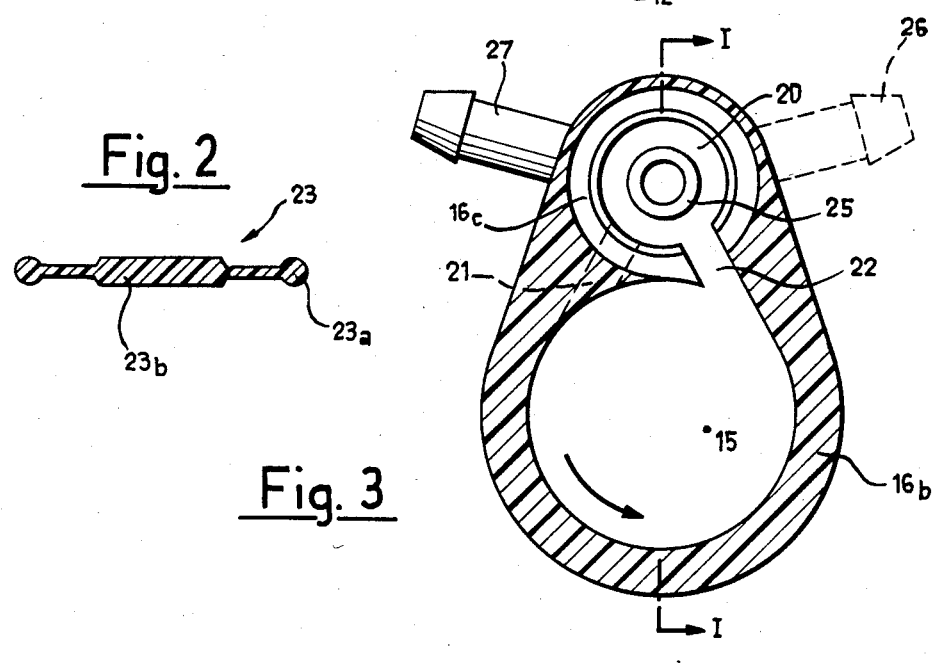
Fig. 2
Fig. 3

SELECTIVELY CONTROLLED DUAL DELIVERY PUMP, PARTICULARLY FOR MOTOR VEHICLE APPLICATION

BACKGROUND OF THE INVENTION

This invention relates to a selectively controlled dual delivery pump, particularly for motor vehicle application.

As is known, modern motor vehicles, and especially motor cars, are equipped with windshield and rear window washers, while a similar system is gaining increasing acceptance for the headlights. In general, each washing system is supplied by an individual pump which may, however, draw from a common reservoir. This involves significant installation costs, which are sometimes unjustified by the motor vehicle class. for example, rear window washers are indeed required on so-called "two-volume" cars, to which class belong most of "compact" cars.

In order to lower costs, it has been proposed of using a dual delivery pump, wherein selective delivery to either of two different systems, such as the windshield washer and rear window washer, is controlled by the direction of rotation of the pump impeller; the two directions of rotation being obtained by switching the polarity of an impeller drive motor.

A dual delivery, selectively controlled pump of this type is disclosed, as an example, in West Germany Patent Application Ser. No. 30 23 897.2, filed on June 26, 1980. That pump makes use, for selectively switching between two delivery lines, of a changeover shutter rotatively driven by the impeller hub, whereto it is connected via a friction clutch. Depending on the impeller direction of rotation, the shutter is moved to engage by contact with the inlet port. This prior arrangement has several disadvantages, and primarily a poor seal at the shutter, which results in the liquid seeping past it into the cut off manifold to the detriment of the enabled one, and a significant power loss due to dissipation by the friction clutch between the shutter and impeller hub, which brings about a further load loss in useful delivery.

Other prior approaches are based on the principle of utilizing the pressure differential which is established at the inlet end of a pair of tangential manifolds selectively positioned the one in the pressure section of the stator and the other in the suction section thereof on changing the impeller direction of rotation. Such manifolds are cut off by one-way valves the shutter whereof is urged into sealing engagement with its respective valve seat by the action of a spring which is calibrated to the maximum pressure differential value. Even the latter approach shows several drawbacks, and especially a great load loss, which brings about a significant reduction in the useful delivery rate owing to the throttling down introduced by the valves and the preload acting on the valve shutters.

SUMMARY OF THE INVENTION

This invention is essentially directed to obviate such problems. In particular, an important object of this invention is to provide a dual delivery pump which can be selectively controlled by reversal of the impeller direction of rotation and incorporating delivery manifold changeover members adapted to ensure, on the one side, complete absence of seepage into the cut off manifold, and on the other side, full use of the pump head for the useful delivery thanks to substantial elimination of leakage, load losses, and/or power losses.

A further important object of the invention is to provide a dual delivery pump as specified, which has a simplified construction, it including in particular no shutter components which are liable to jamming or forming build-ups, thereby the pump can be reliable in operation and relatively inexpensive to manufacture and install.

According to this invention, these and other objects such as will be apparent from the detailed description which follows, are achieved by a selectively controlled dual delivery pump, particularly for motor vehicle application, characterized in that it comprises an impeller accommodated within a stator casing wherein two superimposed manifold chambers are defined, each chamber being in communication with the impeller housing via a respective tangential conduit, and in that said manifold chambers are sealed from each other by an elastic membrane effective to selectively cut off valve seats in each of said manifold chambers according to the pressure differential acting on the faces of said membrane on rotation of said impeller in either directions, said pressure differential producing a high pressure condition in one tangential conduit and a low pressure condition in the other tangential conduit.

The manifold chambers preferably have a circular profile and are located laterally to the impeller housing with their axes parallel to the axis of said impeller housing.

Formed at the center of each manifold chamber is a circular lip defining a valve seat wherewith a thickened center portion of the membrane is arranged to cooperate in contact engagement.

The elastic membrane is preferably formed from an elastomer material, and comprises a peripheral lip of O-ring configuration to provide a seal between the manifold chambers.

BRIEF DESCRIPTION OF THE DRAWING

Further features, objectives, and advantages of the invention will be more readily understood from the following detailed description, with reference to the accompanying drawings, given herein by way of example and not of limitation, and where:

FIG. 1 is an axial sectional view taken through this pump;

FIG. 2 is an enlarged scale, axial section view of the membrane separating the pump manifold chambers; and FIG. 3 is a sectional view taken along the line III—III of FIG. 1.

DESCRIPTION OF THE PREFERRED EMBODIMENTS

In the drawings, the reference numeral 10 designates the body of a pump, which comprises a cylindrical shell of a polymeric material, wherein a housing is formed for accommodating a small electric motor 11; the housing being closed by a cover 12. Keyed to the output shaft 13 of the motor 11 is a pump impeller 14 of the centrifugal type which is mounted for rotation within a respective housing 15 in a stator casing 16. A fitting 17 admits the liquid into the housing 15 through an axial port 18 which surrounds the impeller hub. Bounded by the stator casing 16 are two superimposed manifold chambers 19, 20 of circular configuration, each chamber being communicated with the impeller housing 15 by a respective tangential conduit 21, 22. The axial dimension of the impeller is substantially twice the axial dimension of conventional single delivery pump impellers and the tangential conduits open, the one at the level of the lower half 15a of the housing 15, and the other at the level of the upper half 15b thereof, respectively. Furthermore, said conduits are positioned symmetrically to an axis led through the centers of the manifold chambers and impeller, as shown best in FIG. 3.

Thus, with the impeller rotating in one direction, one conduit will be located at the pressure side and the other at the suction side, and vice versa on reversing the direction of rotation. The manifold chambers 19,20 are sealed from each other by a membrane 23, preferably made of an elastomeric material, whose profile is detailedly shown in FIG. 2. It comprises a peripheral lip 23a configured as an O-ring and adapted to be clamped, for retention as well as to provide a seal, in a respective annular seat 16c of the stator casing which includes, as shown in FIG. 1, a base 16a juxtaposed to a cover 16b. The center portion of the membrane has a thickened portion 23b adapted to sealingly contact corresponding annular raised lips 24 and 25 provided at the center of each manifold chamber 19,20, respectively. Said annular lips form shut-off valve seats for corresponding delivery manifolds 26,27 which are selectively activated according to the impeller direction of rotation. In fact, for one direction of rotation, e.g. counterclockwise as viewed in FIG. 3, the conduit 22 will be under positive pressure and the conduit 21 under negative pressure. The pressure differential which correspondingly establishes itself in the manifold chambers 19 and 20, will act on the faces of the membrane 23 causing it to move in the direction of the positive pressure gradient and engage with its center portion 23b the respective valve seat, in the example shown, the seat 24 of the negative pressure chamber 19. Thus, the membrane will shut off its respective manifold 26, and all of the useful delivery volume from the pump will be discharged to the enabled manifold 27. Upon reversal of the impeller direction of rotation, as by switching the power supply polarity to the motor 11, the pressure differential acting on the membrane faces is correspondingly reversed to result in the manifold 27 being shut off and the manifold 26 being enabled.

It should be noted that, owing to the substantial extension of the membrane 23 and the absolute value of the pressure differential, in the 0.6 to 0.9 atm range, the portion 23b of the membrane is caused to adhere close against the valve seats 24 or 25, thus ensuring a perfect seal with total absence of seepage into the shut-off manifold, which improves the useful delivery rate.

Of course, within the principle of this invention, the constructional details and embodiments thereof may be changed within broad limits with respect to what has been described and illustrated by way of example only without departing from the true scope of the invention.

I claim:

1. A selectively controlled dual delivery pump, particularly for motor vehicle application, comprising a stator casing, an impeller housing within said stator casing, a bidirectional rotating pump impeller within said impeller housing, a manifold room within said stator casing, shutter means in said manifold room, said shutter means defining and hermetically sealing from each other a first and a second manifold chambers in said manifold room, two separate communication conduits extending tangentially from said impeller housing and opening at either said manifold chambers so as to divert a fluid flowing in said impeller housing tangentially to said pump impeller with respect to both rotation directions of said pump impeller, a delivery outlet in each said manifold chamber, a separate delivery manifold departing from each said delivery outlet, a valve seat at said delivery outlet in each manifold chamber in front of said shutter means, said shutter means comprising an elastic membrane for selectively shutting off said valve seats, thereby the rotation direction of said pump impeller causes a high pressure condition in one manifold chamber and a low pressure condition in the other manifold chamber so that the elastic membrane is pushed against and cuts off the valve seat in the manifold chamber at the low pressue condition and shuts off flow in the delivery manifold departing therefrom.

2. A pump according to claim 1, wherein said manifold chambers are arranged superimposed to each other.

3. A pump according to claim 1, wherein said impeller housing defines an impeller housing midplane separating said impeller housing in a lower half and in an upper half, and said manifold chambers are arranged superimposed to each other, said communication conduits extending symmetrically to said impeller housing midplane and opening into said impeller housing at said impeller housing lower half and said impeller housing upper half, respectively.

4. A pump according to claim 1, wherein each said valve seat comprises a raised annular lip extending around said delivery outlet at the center of said manifold chamber.

5. A pump according to claim 1, wherein said membrane comprises a peripheral lip with an O-ring configuration and said stator casing defines a groove extending peripherally to said manifold room and accommodating said peripheral lip to form therewith a seal.

6. A pump according to claim 1, wherein said membrane comprises a thickened center portion cooperating with said valve seat.

7. A pump according to claim 1, wherein said manifold chambers have circular shape and are located laterally to said impeller housing.

8. A pump according to claim 1, wherein said impeller housing and said manifold room define a longitudinal midplane of the pump, said communication conduits extending symmetrically at offset levels with respect to said longitudinal midplane.

* * * * *